(12) United States Patent
Maddali et al.

(10) Patent No.: US 8,171,192 B2
(45) Date of Patent: May 1, 2012

(54) HARDWARE-ASSISTED DEVICE CONFIGURATION DETECTION

(75) Inventors: Srinivas Maddali, San Diego, CA (US); Steven James Doerfler, Erie, CO (US); Elisha John Ulmer, Tiberias (IL); Xinghui Niu, Portland, OR (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/231,389

(22) Filed: Sep. 20, 2005

(65) Prior Publication Data

US 2007/0067520 A1 Mar. 22, 2007

(51) Int. Cl.
*G06F 13/00* (2006.01)
*G06F 9/26* (2006.01)

(52) U.S. Cl. .................. 710/104; 711/167; 711/208
(58) Field of Classification Search .......... 710/104; 711/208, 167
See application file for complete search history.

(56) References Cited

U.S. PATENT DOCUMENTS

| | | | | |
|---|---|---|---|---|
| 5,535,357 A * | 7/1996 | Moran et al. | ............... | 711/103 |
| 5,668,760 A * | 9/1997 | Hazen | ............... | 365/189.14 |
| 5,787,040 A * | 7/1998 | Leon et al. | ............... | 365/195 |
| 5,991,849 A * | 11/1999 | Yamada et al. | ............ | 711/103 |
| 6,279,069 B1 * | 8/2001 | Robinson et al. | ......... | 711/103 |
| 6,647,482 B1 * | 11/2003 | Ronen et al. | ............ | 711/212 |
| 6,687,815 B1 * | 2/2004 | Dwyer et al. | ................ | 713/1 |
| 6,857,058 B1 * | 2/2005 | Gurumoorthy et al. | ..... | 711/209 |
| 6,999,376 B2 * | 2/2006 | Roohparvar | ............... | 365/189.15 |
| 7,055,064 B2 * | 5/2006 | Lin | ............... | 714/23 |
| 7,085,879 B2 * | 8/2006 | Aasheim et al. | ............ | 711/103 |
| 7,149,844 B2 * | 12/2006 | Bernardi et al. | ............ | 711/103 |
| 7,155,579 B1 * | 12/2006 | Neils et al. | ............... | 711/154 |
| 7,257,703 B2 * | 8/2007 | Kishida et al. | ............ | 713/2 |
| 7,296,143 B2 * | 11/2007 | Gaskins et al. | ............ | 713/2 |
| 7,427,027 B2 * | 9/2008 | Elhamias et al. | ............ | 235/451 |
| 7,542,354 B2 * | 6/2009 | Chun et al. | ............ | 365/185.33 |
| 2001/0000822 A1 * | 5/2001 | Dell et al. | ............... | 711/170 |
| 2003/0018869 A1 | 1/2003 | Hou | | |
| 2003/0101325 A1 * | 5/2003 | Desoli et al. | ............ | 711/170 |
| 2003/0172261 A1 * | 9/2003 | Lee et al. | ............... | 713/1 |
| 2003/0210585 A1 * | 11/2003 | Bernardi et al. | ............ | 365/200 |

(Continued)

FOREIGN PATENT DOCUMENTS

EP 1681628 A1 7/2006

(Continued)

OTHER PUBLICATIONS

Intel,PC SDRAM Serial Presence Detect (SPD) Specification, Revision 1.2A, Dec. 1997.*

(Continued)

*Primary Examiner* — Paul R Myers
*Assistant Examiner* — Christopher A Daley
(74) *Attorney, Agent, or Firm* — Timothy F. Loomis; Eric Ho (57) ABSTRACT

A method and apparatus for detecting the configuration of a device in a processing system are described. In one embodiment, a page size parameter associated with a memory device is identified. Further, one or more configuration parameters associated with the memory device are also identified, the page size parameter and the configuration parameters enabling access to the memory device. Finally, a request to download application data from the memory device based on the page size parameter and the one or more configuration parameters is transmitted to the memory device.

55 Claims, 7 Drawing Sheets

U.S. PATENT DOCUMENTS

| | | | |
|---|---|---|---|
| 2004/0017708 A1* | 1/2004 | Choi et al. | 365/200 |
| 2004/0024941 A1* | 2/2004 | Olarig et al. | 710/302 |
| 2005/0283598 A1* | 12/2005 | Gaskins et al. | 713/2 |
| 2006/0195650 A1* | 8/2006 | Su et al. | 711/103 |
| 2007/0016719 A1* | 1/2007 | Ono et al. | 711/103 |

FOREIGN PATENT DOCUMENTS

| | | |
|---|---|---|
| JP | 2004013898 A | 1/2004 |
| JP | 2008527553 A | 7/2008 |
| WO | 9829890 | 7/1998 |
| WO | WO2006074793 A1 | 7/2006 |

OTHER PUBLICATIONS

Micron, Memory Module Serial Presence Detect, Rev. c, 2002.*

ST Mircoelectronics, ST7 Family ICC Protocol Reference Manual, May 2005, version 2.*

Texas Instrument, Nand Memory Device Interface to the TMS320VC55x, Jul. 2002.*

International Search Report and Written Opinion—PCT/US2006/036626, International Search Authority—European Patent Office—Jan. 24, 2007.

Taiwan Search Report—095134854—TIPO, Nov. 17, 2009.

\* cited by examiner

FIG. 7

HARDWARE-ASSISTED DEVICE CONFIGURATION DETECTION

BACKGROUND

1. Field of the Invention

The present invention relates generally to processing systems and, more specifically, to a method and apparatus for detecting the configuration of a device in a processing system.

2. Background

As part of boot-up and initiation procedures in a computing device, such as, for example, a mobile communication device, processors access one or more memory devices, such as, for example, non-volatile or flash memory devices, and download application code or data stored within the memory devices. Several types of memory devices are typically available for implementation in such computing devices and, thus, processors need to ascertain accurately and efficiently the configuration of each memory device. Based on the detected configuration, processors may further generate commands to download the desired application code.

Several implementations have been proposed to ascertain the configuration of the memory devices connected to the processor. In one implementation, the memory device information is stored within the processor during fabrication. However, this approach appears to limit the number of supported memory devices and makes it more difficult to introduce upgrades to the memory devices during the lifetime of the processors.

In another implementation, the memory device information is supplied to the processor through a number of external pins. However, this approach requires dedicated additional pins, thus increasing the cost of the system, and also appears to limit the number of supported memory devices.

In yet another known implementation, the processor may be instructed to detect the configuration of the memory devices through known trial-and-error techniques, such as, for example, binary searches. However, this approach appears to increase the time allocated for boot-up and initiation procedures, thus affecting the performance of the system.

Thus, what is needed is a method and apparatus for accurate and efficient detection of the configuration of multiple memory devices coupled to a processor in a computing device.

SUMMARY

A method and apparatus for detecting the configuration of a device in a processing system are described. In one embodiment, a page size parameter associated with a memory device is identified. Further, one or more configuration parameters associated with the memory device are also identified, the page size parameter and the configuration parameters enabling access to the memory device. Finally, a request to download application data from the memory device based on the page size parameter and the one or more configuration parameters is transmitted to the memory device.

DETAILED DESCRIPTION

Figure 1:
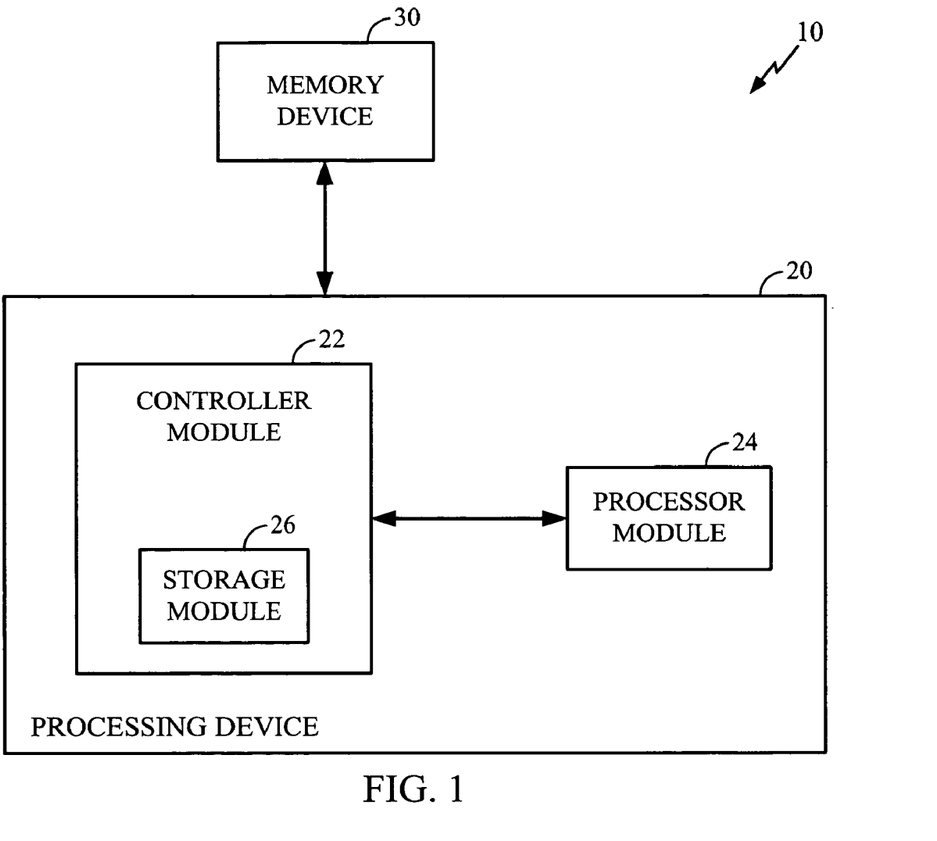
FIG. 1 illustrates an apparatus for detecting the configuration of a device in a processing system, according to one embodiment of the invention.

FIG. 1 illustrates an apparatus for detecting the configuration of a device in a processing system, according to one embodiment of the invention. As illustrated in FIG. 1, the apparatus 10, such as, for example, a mobile communication device, includes a processing device 20, such as, for example, a microprocessor, coupled to one or more memory devices 30.

In one embodiment, the processing device 20 further includes a controller module 22 coupled to a processor module 24. The controller module 22 and the processor module 24 are hardware and/or software modules configured to perform operations for detecting the configuration of the memory devices 30 within the apparatus 10, as described in further detail below. In an alternate embodiment, the controller module 22 and the processor module 24 may form a single processor to perform operations for detecting the configuration of the memory devices 30 within the apparatus 10.

In one embodiment, the memory devices 30 are non-volatile memory devices, such as, for example, serial flash memory devices (e.g., NAND/ORAND/SuperAND memory devices), which store application data to be downloaded upon receipt of a command from the processing device 20. Alternatively, other non-volatile memory devices may be connected to the processing device 20 within the apparatus 10.

Non-volatile memory components and modules do not lose data when system is turned off. The architecture of flash memory devices as non-volatile semiconductor integrated circuits is based on the concept that the memory modules will be seldom written into, but will be read often. Application data resides in the flash memory devices 30 at specific locations defined by corresponding addresses.

The real and virtual memory modules within each memory device 30 are partitioned into blocks of equal size called pages. One memory page represents the number of bits that can be accessed from one row address. Each memory page has a page size, which depends on the number of column addresses. For example, a memory device with 10 column address pins has 1024 locations.

In addition to the page size parameter, each memory device 30 is characterized by an interface bus width parameter, which indicates the number of data bits that may be input or accessed simultaneously. Based on the page size parameter and the bus width parameter, processors may reliably identify the type of each memory device 30 during boot-up and initiation procedures, as described in further detail below.

In one embodiment, as shown in FIG. 1, the controller module 22 maintains and accesses a storage module 26, such as, for example, a database, to store configuration parameters of the memory devices 30, such as, for example, the page size parameter and/or the interface bus width parameter associated with each memory device 30. Alternatively, the controller module 22 may store the page size parameter and/or the interface bus width parameter associated with the memory device 30 in a remote location within the apparatus 10.

Figure 2:
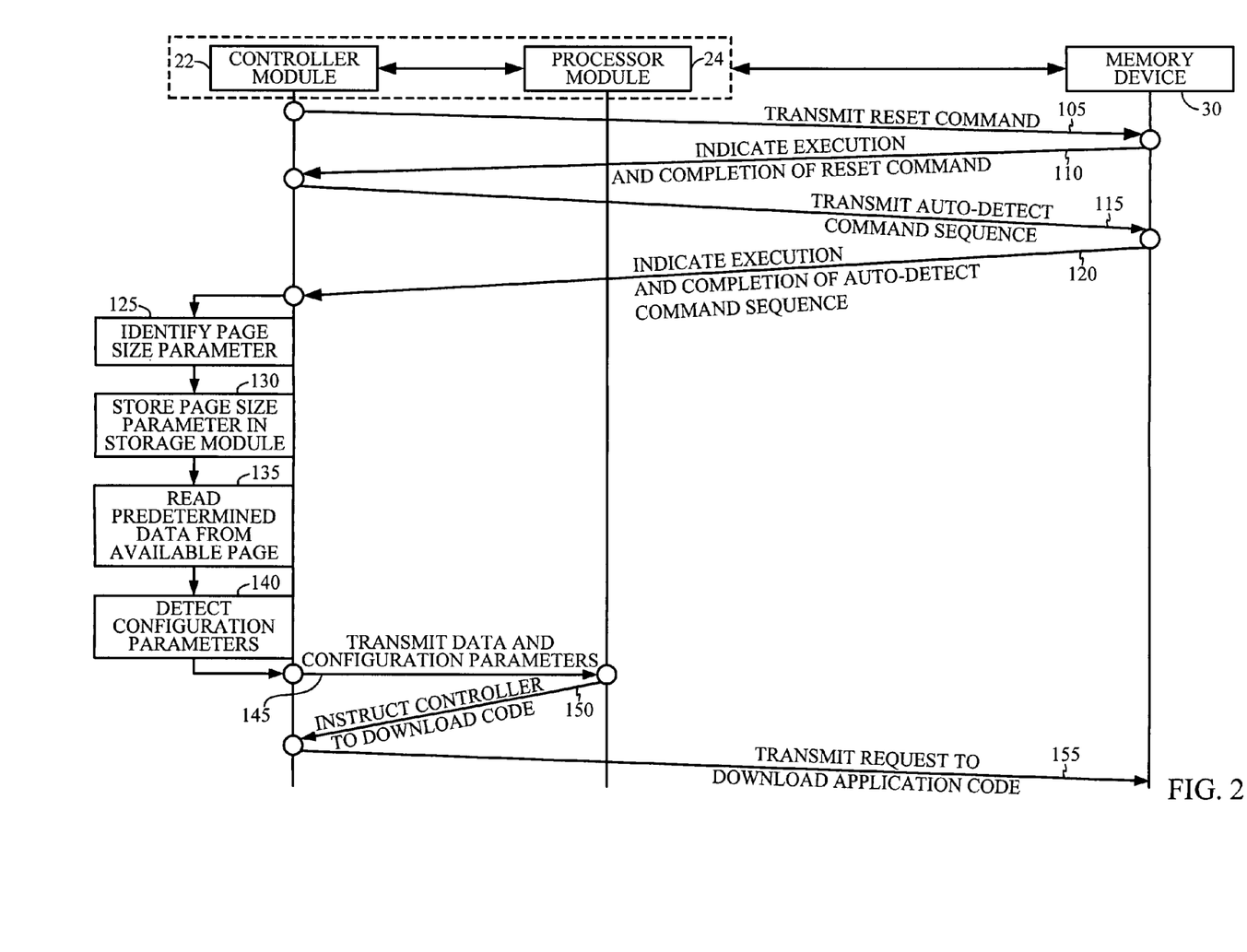
FIG. 2 is an interaction diagram illustrating a procedure for detection of the configuration of a device in a processing system, according to one embodiment of the invention.

FIG. 2 is an interaction diagram illustrating a procedure for detection of the configuration of a device in a processing system, according to one embodiment of the invention. As illustrated in FIG. 2, the procedure starts at block 105, where the controller module 22 within the processing device 20 transmits a reset command to the memory device 30. In one embodiment, the memory device 30 requires receipt and execution of a reset command before accessing the memory during the power-up sequence and subsequent activation of the apparatus 10. Alternatively, the memory device 30 may not support a reset command and may ignore the command when the apparatus 10 is in a stand-by mode, such as, for example, if the memory device 30 is a SuperAND serial flash memory device.

At block 110, the memory device 30 indicates execution and completion of the reset command. In one embodiment, the memory device 30 transmits a bit signal indicating the status of the command execution. The controller module 22 monitors the status of the command execution and detects the completion of the reset command execution, as described in further detail below in connection with FIG. 4.

Subsequently, at block 115, the controller module 22 transmits an auto-detect command sequence to the memory device 30, indicating a predetermined amount of data needed to read and detect the page size of the memory device 30. In one embodiment, the reset command and the auto-detect command are sent successively to the memory device 30. The auto-detect command sequence is a flow used to detect the page size and other parameters related to the memory device 30. The auto-detect sequence uses the difference in the behavior of 256/512 byte page flash memory devices as opposed to other flash memory devices having a higher value page size, as described in further detail below in connection with FIG. 5.

At block 120, the memory device 30 receives the auto-detect command sequence and indicates execution and completion of the command. In one embodiment, the memory device 30 transmits a bit signal indicating the status of the execution of each command within the auto-detect sequence. The controller module 22 monitors the status of the command execution and detects the completion of the auto-detect sequence, as described in further detail below in connection with FIG. 5. Based on the bit signal transmitted from the memory device 30, indicating the response to the auto-detect sequence, the controller module 22 then identifies whether the memory device 30 is a 256/512 byte page device or a bigger size page device, such as, for example, a 2K byte page device, as described in further detail in connection with FIG. 5. Once the execution of the command is complete, the memory device 30 makes available a page of data to the controller module 22, for example, in an internal buffer residing on the memory device 30.

At block 125, the controller module 22 accesses the available page data and again identifies the page size parameter of the memory device 30, as described in further detail in connection with FIG. 6.

At block 130, the controller module 22 stores the page size parameter associated with the memory device 30 in the storage module 26.

At block 135, the controller module 22 reads the predetermined amount of data from the available page data. At block 140, the controller module 22 detects one or more configuration parameters associated with the memory device 30 based on the data read. In one embodiment, the controller module 22 retrieves and decodes multiple predetermined data sequences from the page data to identify the configuration parameters, such as, for example, an interface bus width parameter of the memory device 30. In an alternate embodiment, the page data made available to the controller module 22 may be encrypted for security reasons and, thus, the controller module 22 or the processor module 24 further decrypt the data prior to decoding and identification of the configuration parameters, such as, for example, the interface bus width parameter or other needed configuration parameters.

In one embodiment, the stored page size parameter and the identified configuration parameters enable the processing device 20 to ascertain the configuration of the memory device 30. In an alternate embodiment, the page data may incorporate other information related to the memory device 30, such as, for example, other components connected to the memory device 30.

At block 145, the controller module 22 transmits or otherwise makes available to the processor module 24 the page data and the configuration parameters, including the page size parameter stored within the storage module 26. At block 150, the processor module 24 instructs the controller module 22 to download application code from the memory device 30. Finally, at block 155, based on the page size parameter and the interface bus width parameter, the controller module 22 within the processing device 20 transmits a request to download application code from the memory device 30.

Figure 3:
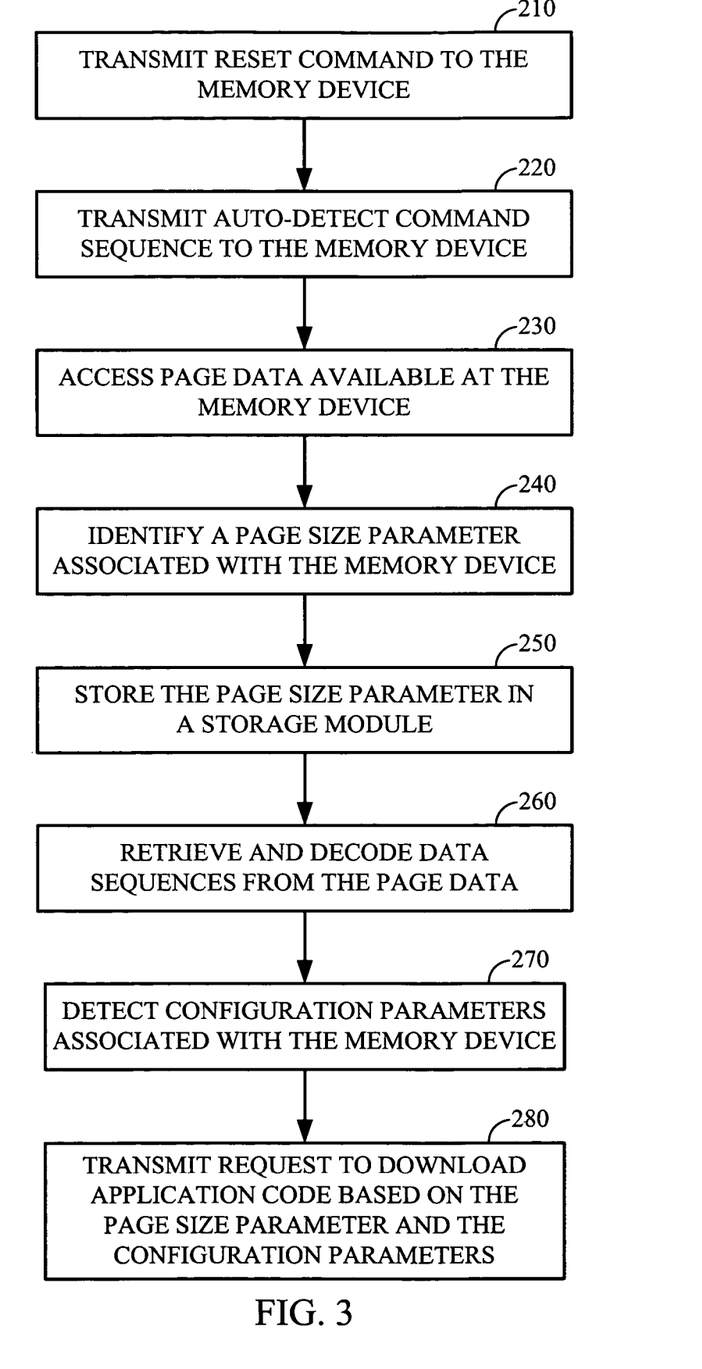
FIG. 3 is a flow diagram illustrating a method for detecting the configuration of a device in a processing system, according to one embodiment of the invention.

FIG. 3 is a flow diagram illustrating a method for detecting the configuration of a device in a processing system, according to one embodiment of the invention. As illustrated in the embodiment of FIG. 3, at processing block 210, a reset command is issued and transmitted to the memory device 30. At processing block 220, an auto-detect command sequence is issued and transmitted to the memory device 30.

At processing block 230, page data containing a predetermined amount of data is accessed at the memory device 30. At processing block 240, a page size parameter associated with the memory device 30 is identified from the available page data.

At processing block 250, the page size parameter associated with the memory device 30 is stored in a storage module 26. At processing block 260, multiple predetermined data sequences are retrieved and decoded from the page data to identify one or more configuration parameters associated with the memory device 30, such as an interface bus width parameter of the memory device 30.

At processing block 270, the configuration parameters associated with the memory device 30 are detected. Finally, at processing block 280, based on the identified page size parameter and configuration parameters, a request to download the application code is transmitted to the memory device 30.

Figure 4:
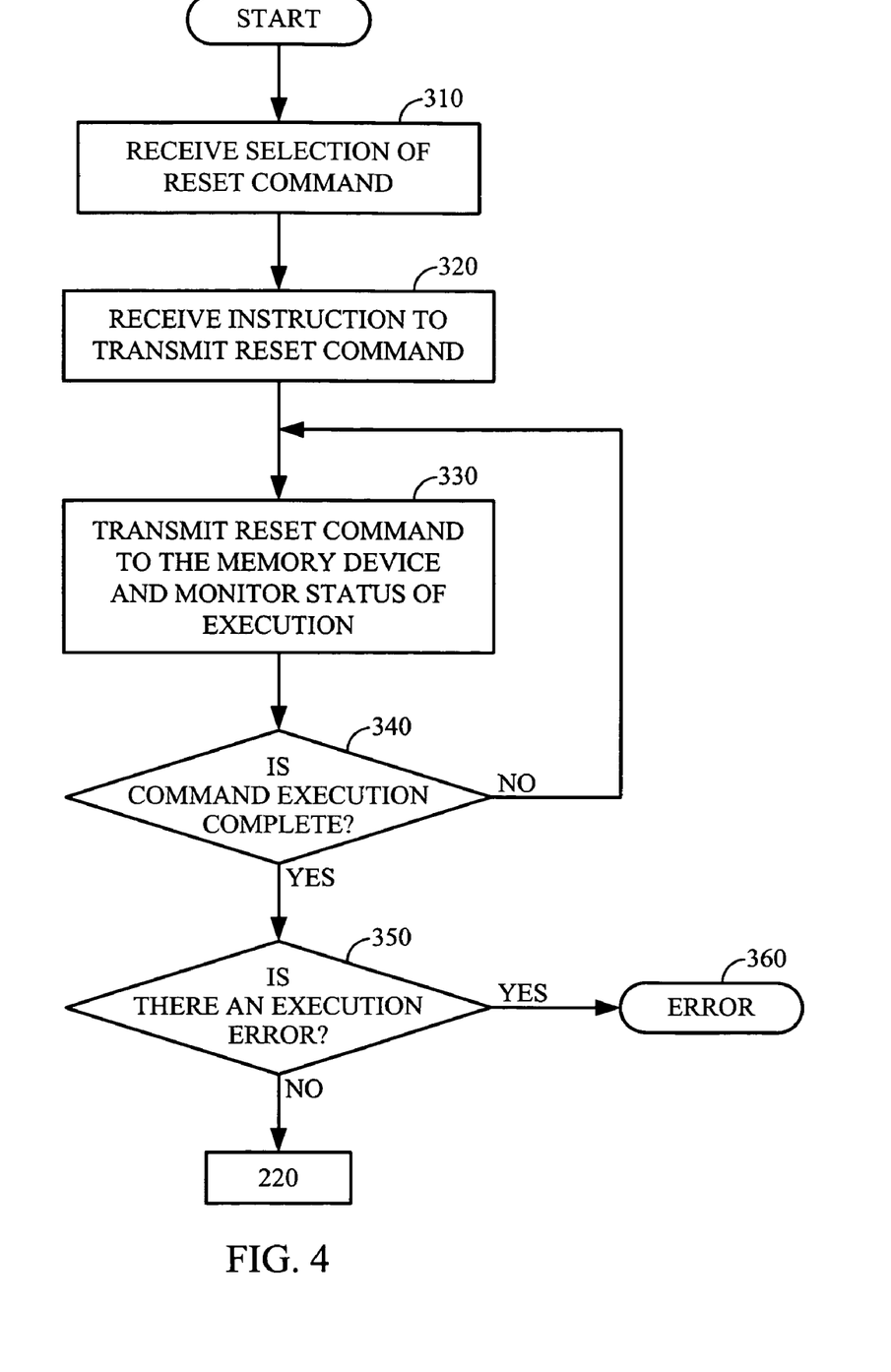
FIG. 4 is a flow diagram illustrating the execution of a reset command within the method for detecting the configuration of a device in a processing system, according to one embodiment of the invention.

FIG. 4 is a flow diagram illustrating the execution of a reset command within the method for detecting the configuration of a device in a processing system, according to one embodiment of the invention. As illustrated in FIG. 4, at processing block 310, selection of a reset command is received. In one embodiment, the controller module 22 receives a choice of a reset command from the processor module 24 for further transmission to the memory device 30.

At processing block 320, an instruction to transmit the reset command is received. In one embodiment, the processor module 24 prompts the controller module 22 to issue the reset command and to transmit the reset command to the memory device 30.

At processing block 330, the reset command is transmitted to the memory device 30 and status of the execution of the reset command is monitored. In one embodiment, the controller module 22 transmits the reset command to the memory device 30 and further checks the status of the execution at the memory device 30 by monitoring assertion or de-assertion of a bit signal transmitted by the memory device 30, the bit signal indicating completion of the reset command execution.

At processing block 340, a decision is made whether the execution of the reset command is complete. If the execution of the reset command is not complete, processing blocks 330 and 340 are repeated.

Otherwise, if the execution of the reset command is complete, at processing block 350, a subsequent decision is made whether any execution errors are present. If execution errors are present, at processing block 360, the controller module 22 issues an error command and instructs the processor module 24 of the execution errors. Otherwise, if the execution of the reset command is error free, the procedure jumps to block 220 discussed in detail in connection with FIG. 3.

Figure 5:
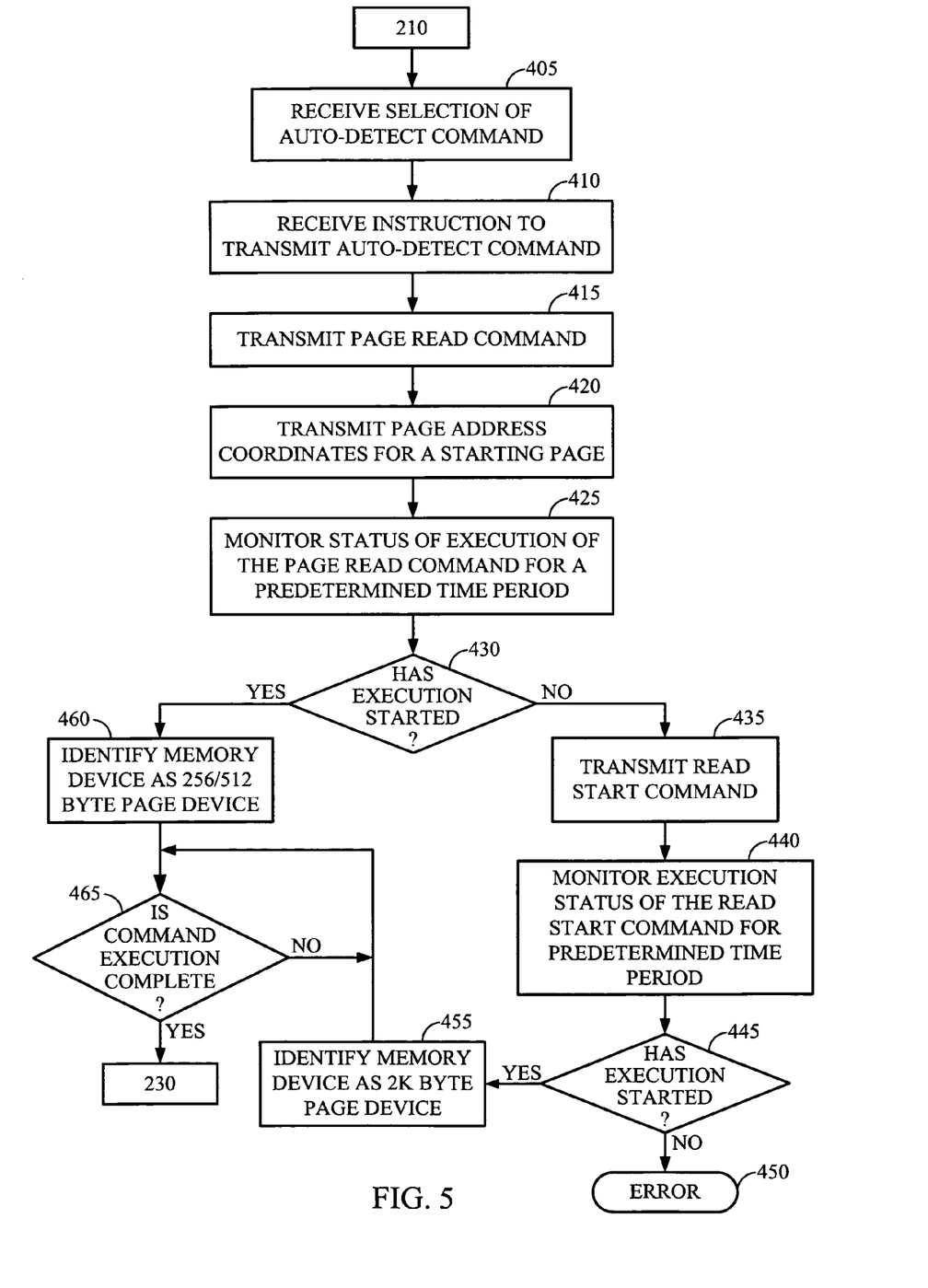
FIG. 5 is a flow diagram illustrating the execution of an auto-detect command sequence within the method for detecting the configuration of a device in a processing system, according to one embodiment of the invention.

FIG. 5 is a flow diagram illustrating the execution of an auto-detect command sequence within the method for detecting the configuration of a device in a processing system, according to one embodiment of the invention. As illustrated in FIG. 5, subsequent to the processing block 210 discussed in detail in connection with FIG. 3, at processing block 405, selection of an auto-detect command is received. In one embodiment, the controller module 22 receives a choice of command from the processor module 24 for further transmission to the memory device 30.

At processing block 410, an instruction to transmit an auto-detect command sequence is received. In one embodiment, the processor module 24 prompts the controller module 22 to issue the auto-detect command sequence and to transmit the related commands to the memory device 30.

At processing block 415, a page read command is transmitted to the memory device 30 and status of the execution of the page read command is subsequently monitored. In one embodiment, the controller module 22 transmits the page read command to the memory device 30.

At processing block 420, page address coordinates are transmitted to the memory device 30. In one embodiment, the controller module 22 transmits page address coordinates, such as, for example a starting column address and a starting row address for the start of the memory page.

At processing block 425, execution status of the page read command is monitored for a predetermined time period. In one embodiment, the controller module 22 further checks the status of the execution of the page read command at the memory device 30 by monitoring assertion or de-assertion of a bit signal transmitted by the memory device 30 for a predetermined period of time, the bit signal indicating the start of the page read command execution. In one embodiment, the predetermined time period is 300 nanoseconds. Alternatively, the controller module 22 may be programmed to wait and to monitor the execution status for other different time periods.

At processing block 430, a decision is made whether the execution of the page read command has started. If the controller module 22 detects that the execution of the page read command has already started, at processing block 460, the controller module 22 identifies the memory device 30 as having a 256 byte/512 byte page size.

In one embodiment, if the controller module 22 detects that the execution of the page read command has not started, at processing block 435, the controller module 22 transmits a read start command to the memory device 30.

At processing block 440, execution status of the read start command is monitored for a predetermined time period. In one embodiment, the controller module 22 further checks the status of the execution of the read start command at the memory device 30 by monitoring assertion or de-assertion of a bit signal transmitted by the memory device 30 for a second predetermined period of time, the bit signal indicating execution of the read start command. In one embodiment, the predetermined time period is 300 nanoseconds. Alternatively, the controller module 22 may be programmed to monitor the execution of the read start command for other different time periods.

At processing block 445, a decision is made whether the execution of the page read command has started. If the execution of the page read command has not yet started, at processing block 450, the controller module 22 issues an error command and instructs the processor module 24 of the execution errors. Otherwise, in one embodiment, if the execution of the page read command has started, then at processing block 455, the controller module 22 identifies the memory device 30 as having a higher value byte page size, such as, for example, a 2K byte page size.

After the page size parameter of the memory device 30 has been ascertained, the procedure continues at processing block 465, where, in one embodiment, a decision is made whether the auto-detect command sequence execution is complete. In an alternate embodiment, for certain serial flash memory devices, such as, for example, SuperAND flash memory devices, a read stop command must be issued to stop the page read and to complete the auto-detect command sequence.

In one embodiment, when the execution of the auto-detect command sequence is complete, the procedure jumps to block 230 discussed in detail in connection with FIG. 3.

Figure 6:
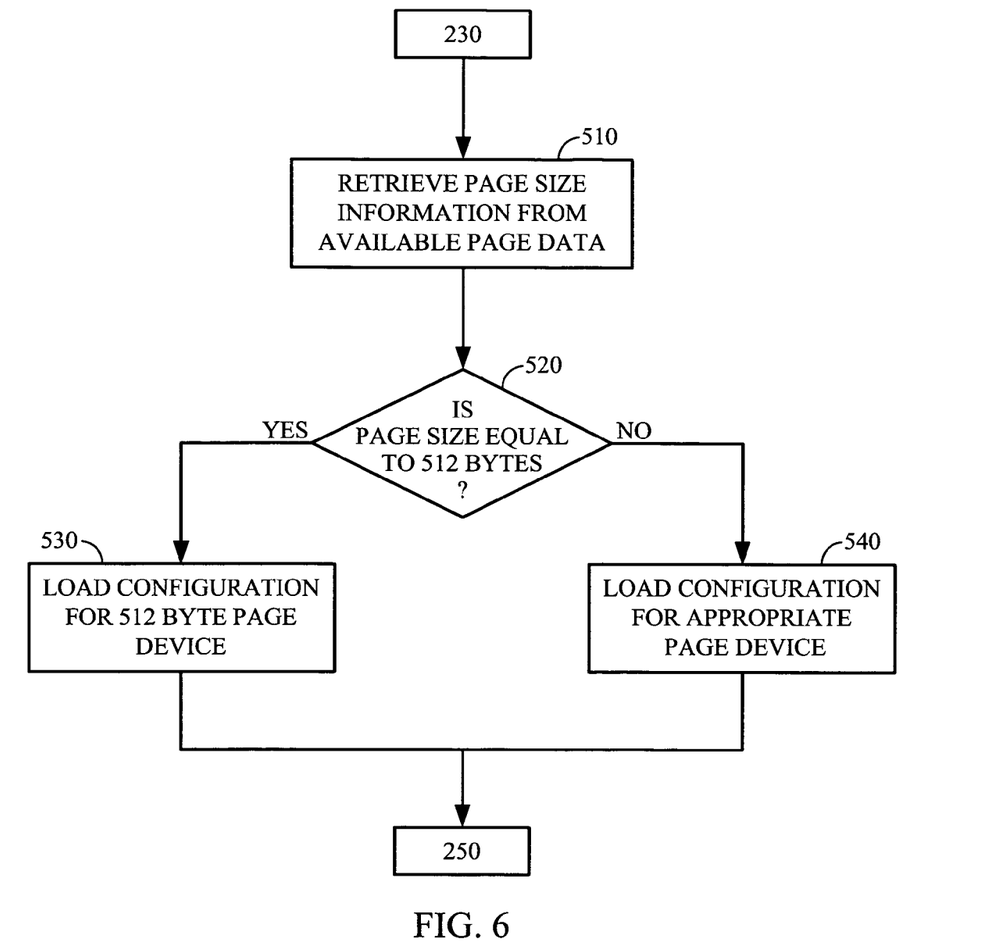
FIG. 6 is a flow diagram illustrating the identification of a page size parameter within the method for detecting the configuration of a device in a processing system, according to one embodiment of the invention.

FIG. 6 is a flow diagram illustrating the identification of a page size parameter within the method for detecting the configuration of a device in a processing system, according to one embodiment of the invention. As illustrated in FIG. 6, subsequent to the processing block 230 discussed in detail in connection with FIG. 3, at processing block 510, page size information is retrieved from the available page data. In one embodiment, the controller module 22 accesses the page data made available at the memory device 30, performs an additional check on the page size of the memory device 30, and detects the page size parameter associated with the respective memory device 30.

In one embodiment, at processing block 520, a decision is made whether the page size is equal to a predetermined value, such as, for example, 512 bytes. If the controller module 22 realizes that the page size of the memory device 30 is equal to the predetermined value, in this case 512 bytes, at processing block 530, the controller module 22 is further configured for the 512 byte page memory device 30. Otherwise, if the page size associated with the memory device 30 has a different value, such as, for example, 2K bytes, at processing block 540, the controller module 22 is further configured for the appropriate byte value of the page made available by the memory device 30. Finally, the procedure jumps to block 250 discussed in detail in connection with FIG. 3.

Figure 7:
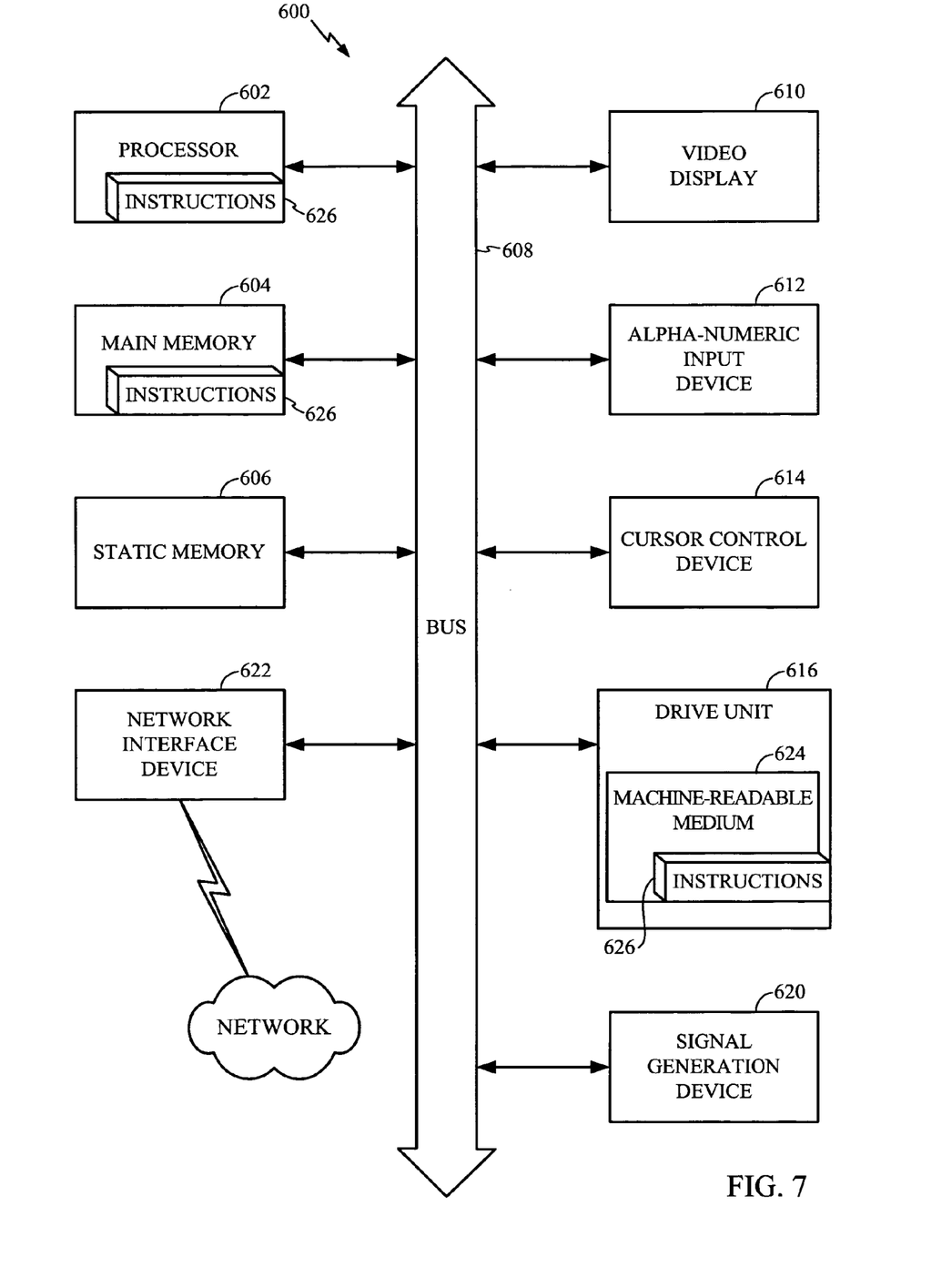
FIG. 7 is a diagrammatic representation of a machine in the exemplary form of a computer system within which a set of instructions may be executed.

FIG. 7 shows a diagrammatic representation of a machine in the exemplary form of a computer system 600 within which a set of instructions, for causing the machine to perform any one of the methodologies discussed above, may be executed. In alternative embodiments, the machine may comprise a network router, a network switch, a Personal Digital Assistant (PDA), a cellular telephone, a web appliance or any machine or computing device capable of executing a sequence of instructions that specify actions to be taken by that machine.

The computer system 600 includes a processor 602, a main memory 604 and a static memory 606, which communicate with each other via a bus 608. The computer system 600 may further include a video display unit 610, e.g. a liquid crystal display (LCD) or a cathode ray tube (CRT). The computer system 600 also includes an alphanumeric input device 612, e.g, a keyboard, a cursor control device 614, e.g. a mouse, a disk drive unit 616, a signal generation device 620, e.g. a speaker, and a network interface device 622.

The disk drive unit 616 includes a machine-readable medium 624 on which is stored a set of instructions, i.e. software, 626 embodying any one, or all, of the methodologies described above. The software 626 is also shown to reside, completely or at least partially, within the main memory 604 and/or within the processor 602. The software 626 may further be transmitted or received via the network interface device 622.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing or transmitting information in a form readable by a machine (e.g., a computer). For example, a machine readable medium includes RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for configuration detection, comprising:
   transmitting a reset command to a non-volatile memory device;
   monitoring status of execution of said reset command by monitoring a bit signal received from said non-volatile memory device, said bit signal indicating completion of execution of said reset command;
   selecting and transmitting an auto-detect command sequence to said non-volatile memory device, said auto-detect command sequence indicating a predetermined amount of data needed to detect a page size parameter, wherein said auto-detect command sequence further comprises:
      a page read command to said non-volatile memory device;
      page address coordinates for a first data page to said non-volatile memory device; and
      a command for monitoring status of execution of said page read command for a predetermined period of time;
   accessing page data available from said non-volatile memory device, said page data containing said predetermined amount of data;
   identifying a page size parameter associated with said non-volatile memory device on a basis of a time interval between sending the page read command to the non-volatile memory device and the non-volatile memory device executing the page read command;
   identifying at least one configuration parameter associated with said non-volatile memory device by retrieving and decoding a plurality of pre-determined data sequences from the accessed page data, said page size parameter and said at least one configuration parameter enabling configuration detection of said non-volatile memory device; and
   transmitting a request to download application data from said non-volatile memory device based on said page size parameter and said at least one configuration parameter.

2. The method according to claim 1, wherein identifying said page size parameter further comprises storing said page size parameter in a storage module.

3. The method according to claim 1, wherein said predetermined period of time is 300 nanoseconds.

4. The method according to claim 1, further comprising:
identifying a 256/512 byte value for said page size parameter and said non-volatile memory device as a 256/512 byte page size non-volatile memory device if said non-volatile memory device starts execution of said page read command within said predetermined period of time.

5. The method according to claim 1, wherein said monitoring further comprises:
monitoring a bit signal received from said non-volatile memory device, said bit signal indicating the start of execution of said page read command.

6. The method according to claim 1, further comprising:
transmitting a read start command to said non-volatile memory device if said non-volatile memory device fails to start execution of said page read command within said predetermined period of time; and
monitoring status of execution of said read start command for a second predetermined period of time.

7. The method according to claim 6, further comprising:
identifying a predetermined value for said page size parameter as being higher than a 512 byte value if said non-volatile memory device starts execution of said read start command within said second predetermined period of time.

8. The method according to claim 7, wherein said predetermined value is a 2K byte value.

9. The method according to claim 6, wherein monitoring status of execution of said read start command further comprises:
monitoring a bit signal received from said non-volatile memory device, said bit signal indicating the start of execution of said page read start command.

10. The method according to claim 1, wherein said at least one configuration parameter further comprises an interface bus width parameter associated with said non-volatile memory device.

11. The method according to claim 1, wherein identifying said page size parameter further comprises:
determining whether said page size parameter has a 512 byte value.

12. The method according to claim 11, further comprising:
loading a predetermined configuration associated with said 512 byte value of said page size parameter.

13. The method according to claim 11, further comprising:
loading a predetermined configuration associated with a detected value of said page size parameter if said page size parameter does not have a 512 byte value.

14. The method according to claim 1, wherein transmitting said request to download application data further comprises:
receiving an instruction from a processor module to download application data.

15. An apparatus for configuration detection, comprising:
a controller module for transmitting a reset command to a non-volatile memory device, monitoring status of execution of said reset command by monitoring a bit signal received from said non-volatile memory device, said bit signal indicating completion of execution of said reset command, selecting and transmitting an auto-detect command sequence to said non-volatile memory device, said auto-detect command sequence indicating a predetermined amount of data needed to detect a page size parameter, wherein said auto-detect command sequence comprises a page read command to said non-volatile memory device, page address coordinates for a first data page to said non-volatile memory device, and a command to monitor status of execution of said page read command for a predetermined period of time, accessing page data available from said non-volatile memory device, said page data containing said predetermined amount of data, identifying a page size parameter associated with said non-volatile memory device based on a time interval between sending the page read command to the non-volatile memory device and the non-volatile memory device executing the page read command, and for identifying at least one configuration parameter associated with said non-volatile memory device by retrieving and decoding a plurality of predetermined data sequences from the accessed page data, said page size parameter and said at least one configuration parameter enabling detection of said non-volatile memory device; and
a processor module coupled to said controller module for instructing said controller module to download application data from said non-volatile memory device based on said page size parameter and said at least one configuration parameter, said controller module further transmitting a request to download said application data to said non-volatile memory device.

16. The apparatus according to claim 15, said controller module further stores said page size parameter in a storage module.

17. The apparatus according to claim 15, wherein said predetermined period of time is 300 nanoseconds.

18. The apparatus according to claim 15, wherein said controller module further identifies a 256/512 byte value for said page size parameter and said non-volatile memory device as a 256/512 byte page size non-volatile memory device if said non-volatile memory device starts execution of said page read command within said predetermined period of time.

19. The apparatus according to claim 15, wherein said controller module further monitors a bit signal received from said non-volatile memory device, said bit signal indicating the start of execution of said page read command.

20. The apparatus according to claim 15, wherein said controller module further transmits a read start command to said non-volatile memory device if said non-volatile memory device fails to start execution of said page read command within said predetermined period of time, and monitors status of execution of said read start command for a second predetermined period of time.

21. The apparatus according to claim 20, wherein said controller module further identifies a predetermined value for said page size parameter as being higher than a 512 byte value if said non-volatile memory device starts execution of said read start command within said second predetermined period of time.

22. The apparatus according to claim 21, wherein said predetermined value is a 2K byte value.

23. The apparatus according to claim 20, wherein said controller module further monitors a bit signal received from said non-volatile memory device, said bit signal indicating the start of execution of said page read start command.

24. The apparatus according to claim 15, wherein said at least one configuration parameter further comprises an interface bus width parameter associated with said non-volatile memory device.

25. The apparatus according to claim 15, wherein said controller module further determines whether said page size parameter has a 512 byte value.

26. The apparatus according to claim 25, wherein said controller module further loads a predetermined configuration associated with said 512 byte value of said page size parameter.

27. The apparatus according to claim 25, wherein said controller module further loads a predetermined configuration associated with a detected value of said page size parameter if said page size parameter does not have a 512 byte value.

28. An apparatus for configuration detection, comprising:
means for transmitting a reset command to a non-volatile memory device;
means for monitoring status of execution of said reset command by monitoring a bit signal received from said non-volatile memory device, said bit signal indicating completion of execution of said reset command;
means for selecting and transmitting an auto-detect command sequence to said non-volatile memory device, said auto-detect command sequence indicating a predetermined amount of data needed to detect a page size parameter, wherein said auto-detect command sequence further comprises a page read command to said non-volatile memory device, page address coordinates for a first data page to said non-volatile memory device, and a command to monitor status of execution of said page read command for a predetermined period of time;
means for accessing page data available from said non-volatile memory device, said page data containing said predetermined amount of data;
means for identifying a page size parameter associated with said non-volatile memory device on a basis of a time interval between sending the page read command to the non-volatile memory device and the non-volatile memory device executing the page read command;
means for identifying at least one configuration parameter associated with non-volatile memory device comprising means for retrieving a plurality of pre-determined data sequences from the accessed page data and means for decoding the retrieved plurality of pre-determined data sequences, said page size parameter and said at least one configuration parameter enabling configuration detection of said non-volatile memory device; and
means for transmitting a request to download application data from said non-volatile memory device based on said page size parameter and said at least one configuration parameter.

29. The apparatus according to claim 28, further comprising means for storing said page size parameter in a storage module.

30. The apparatus according to claim 28, wherein said predetermined period of time is 300 nanoseconds.

31. The apparatus according to claim 28, further comprising:
means for identifying a 256/512 byte value for said page size parameter and said non-volatile memory device as a 256/512 byte page size non-volatile memory device if said non-volatile memory device starts execution of said page read command within said predetermined period of time.

32. The apparatus according to claim 28, further comprising:
means for monitoring a bit signal received from said non-volatile memory device, said bit signal indicating the start of execution of said page read command.

33. The apparatus according to claim 28, further comprising:
means for transmitting a read start command to said non-volatile memory device if said non-volatile memory device fails to start execution of said page read command within said predetermined period of time; and
means for monitoring status of execution of said read start command for a second predetermined period of time.

34. The apparatus according to claim 33, further comprising:
means for identifying a predetermined value for said page size parameter as being higher than a 512 byte value if said non-volatile memory device starts execution of said read start command within said second predetermined period of time.

35. The apparatus according to claim 34, wherein said predetermined value is a 2K byte value.

36. The apparatus according to claim 33, further comprising:
means for monitoring a bit signal received from said non-volatile memory device, said bit signal indicating the start of execution of said page read start command.

37. The apparatus according to claim 28, wherein said at least one configuration parameter further comprises an interface bus width parameter associated with said non-volatile memory device.

38. The apparatus according to claim 28, further comprising:
means for determining whether said page size parameter has a 512 byte value.

39. The apparatus according to claim 38, further comprising:
means for loading a predetermined configuration associated with said 512 byte value of said page size parameter.

40. The apparatus according to claim 38, further comprising:
means for loading a predetermined configuration associated with a detected value of said page size parameter if said page size parameter does not have a 512 byte value.

41. The apparatus according to claim 28, further comprising:
means for receiving an instruction from a processor module to download application data.

42. A non-transitory computer readable medium encoded with computer-executable instructions, wherein execution of the computer-executable instructions causes a computer to accomplish configuration detection by:
transmitting a reset command to a non-volatile memory device;
monitoring status of execution of said reset command by monitoring a bit signal received from said non-volatile memory device, said bit signal indicating completion of execution of said reset command;
selecting and transmitting an auto-detect command sequence to said non-volatile memory device, said auto-detect command sequence indicating a predetermined amount of data needed to detect a page size parameter, wherein said auto-detect command sequence further comprises:
a page read command to said non-volatile memory device;
page address coordinates for a first data page to said non-volatile memory device; and
a command for monitoring status of execution of said page read command for a predetermined period of time;
accessing page data available from said non-volatile memory device, said page data containing said predetermined amount of data;
identifying a page size parameter associated with said non-volatile memory device on a basis of a time interval between sending the page read command to the non-volatile memory device and the non-volatile memory device executing the page read command;

identifying at least one configuration parameter associated with said non-volatile memory device by retrieving and decoding a plurality of pre-determined data sequences from the accessed page data, said page size parameter and said at least one configuration parameter enabling configuration detection of said non-volatile memory device; and transmitting a request to download application data from said non-volatile memory device based on said page size parameter and said at least one configuration parameter.

43. The computer readable medium according to claim 42, wherein identifying said page size parameter further comprises storing said page size parameter in a storage module.

44. The computer readable medium according to claim 42, wherein said predetermined period of time is 300 nanoseconds.

45. The computer readable medium according to claim 42, wherein execution of the computer-executable instructions is further for:

identifying a 256/512 byte value for said page size parameter and said non-volatile memory device as a 256/512 byte page size non-volatile memory device if said non-volatile memory device starts execution of said page read command within said predetermined period of time.

46. The computer readable medium according to claim 42, wherein execution of the computer-executable instructions for monitoring is further for:

monitoring a bit signal received from said non-volatile memory device, said bit signal indicating the start of execution of said page read command.

47. The computer readable medium according to claim 42, wherein execution of the computer-executable instructions is further for:

transmitting a read start command to said non-volatile memory device if said non-volatile memory device fails to start execution of said page read command within said predetermined period of time; and monitoring status of execution of said read start command for a second predetermined period of time.

48. The computer readable medium according to claim 47, wherein execution of the computer-executable instructions is further for:

identifying a predetermined value for said page size parameter as being higher than a 512 byte value if said non-volatile memory device starts execution of said read start command within said second predetermined period of time.

49. The computer readable medium according to claim 48, wherein said predetermined value is a 2K byte value.

50. The computer readable medium according to claim 47, wherein execution of the computer-executable instructions for monitoring status of execution of said read start command is further for:

monitoring a bit signal received from said non-volatile memory device, said bit signal indicating the start of execution of said page read start command.

51. The computer readable medium according to claim 42, wherein said at least one configuration parameter further comprises an interface bus width parameter associated with said non-volatile memory device.

52. The computer readable medium according to claim 42, wherein execution of the computer-executable instructions for identifying said page size parameter is further for:

determining whether said page size parameter has a 512 byte value.

53. The computer readable medium according to claim 52, wherein execution of the computer-executable instructions is further for:

loading a predetermined configuration associated with said 512 byte value of said page size parameter.

54. The computer readable medium according to claim 52, wherein execution of the computer-executable instructions is further for:

loading a predetermined configuration associated with a detected value of said page size parameter if said page size parameter does not have a 512 byte value.

55. The computer readable medium according to claim 42, wherein execution of the computer-executable instructions for transmitting said request to download application data is further for:

receiving an instruction from a processor module to download application data.

* * * * *